United States Patent Office 3,437,304
Patented Apr. 8, 1969

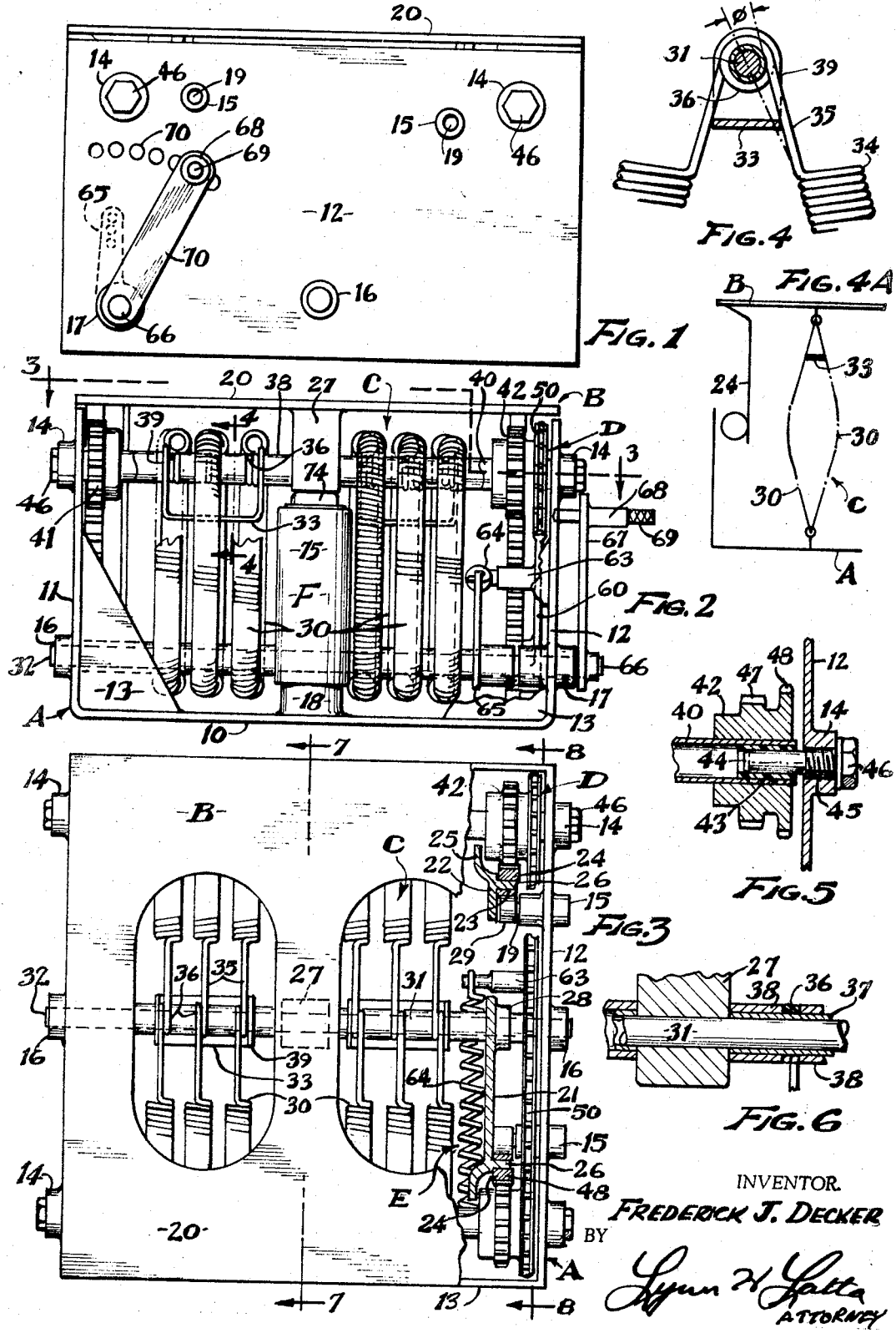

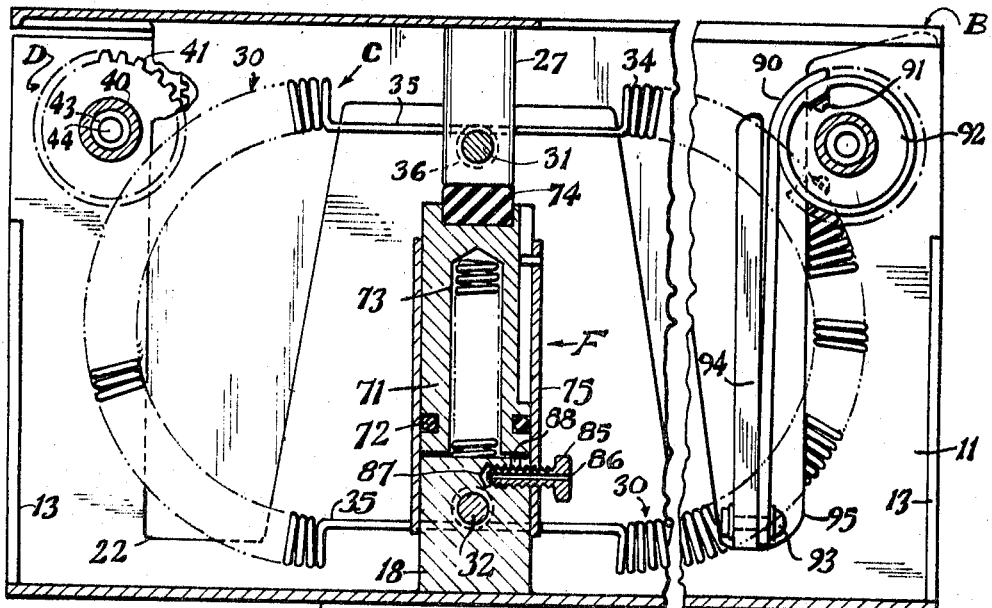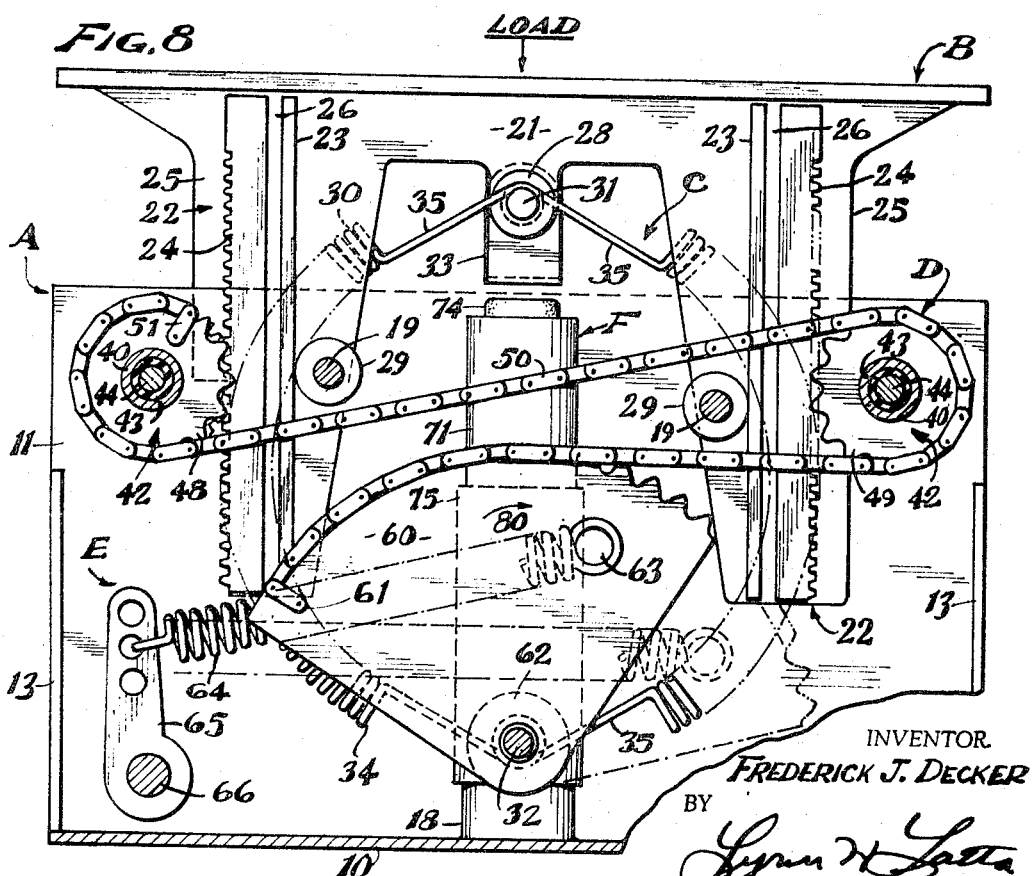

3,437,304
SEAT WITH BIFLEX SPRING CUSHIONING AND REBOUND CHECKING
Frederick J. Decker, Pittsford, N.Y., assignor to Russell Vis, San Clemente, Calif.
Filed Aug. 29, 1966, Ser. No. 575,702
Int. Cl. F16m *13/06;* A47c *7/02*
U.S. Cl. 248—399                                       11 Claims

ABSTRACT OF THE DISCLOSURE

A cushioning seat support combining preloaded bending type coil springs of constant force throughout their compression strokes, together with adjustable load-balancing springs which absorb a portion of the preload and relieve the bending springs of such preload portion. The springs are interposed as a yielding supporting connection between a base and a seat platform which is also connected to the base by levelling mechanism. The bending type springs are bowed laterally on opposite sides of a vertical axis and have a high-rate resistance to preloading so as to absorb and support at least a major portion of the static load.

SUMMARY OF INVENTION

This invention provides a cushioned platform for a vehicle driver's seat, or for a a camera, or for other uses requiring highly efficient cushioning of the seat or platform with reference to a vehicle (truck, auto, tractor, airplane, etc.) in which it is carried, and requiring that the seat or platform be insulated to as high a degree as possible from vibrations and shocks generated in or imported to the vehicle.

The invention utilizes a combination of flexing type coil springs having substantially constant force throughout a compression stroke beyond a rest position in which they are initially flexed by a preload; and a load-balancing spring or springs which absorb a proportion of the preload not carried by the flexing-compression springs. The low spring rate of the flexing springs, in their operating range, coupled with the higher spring rate of the balancing spring, provides an unusually "soft" absorption of road shocks and the like over a fairly deep stroke range, since the balancing spring carries only a portion of the load, which in some applications can be a minor proportion, and the deflection resistance of the preloaded flexing springs is quite low.

The invention further provides for load adjustment of the balancing spring e.g. to compensate for variations in weight of a vehicle driver occupying the seat.

The invention further utilizes the flexing springs for gently returning the seat to a normal position after initial rebound action of the load-balancing spring.

The invention further utilizes a geared or cable-pulley connection between the seat platform and a base to maintain the platform levelled with reference to the base while its load is carried by springs acting between the platform and the base.

THE PRIOR ART

The flexing type springs utilized by the invention may be of the type made by Hunter Spring Division, Ametek, Inc., of Hatfield, Pa., under Patent Re. 23,974.

Spring-supported seats with levelling or equalizing mechanism of lazy-tongs or sliding-guide type are disclosed in the following patents:

Bostrom _____ 2,641,309
Pallenberg (coil springs) _____ 1,647,247
Schreiber (coil springs) _____ 1,423,460

Other patents disclosing seats with such levelling mechanism combined with cushioning means are:

Simons _____ 2,855,026
Simons _____ 3,109,621
Radke _____ 3,059,890

The following patents disclose other spring suspensions:

Upton (in which spring pull is applied torsionally to an equalizer shaft) _____ 1,180,888
Momchilov _____ 2,935,313
Forstrom _____ 1,223,486

DESCRIPTION OF INVENTION

An object of the invention is to utilize the combination of flexing type springs, of low rate when preloaded, and positive-rate load-balancing spring means, for attaining increased efficiency of shock-absorption through a wide deflection range in providing a "soft" ride. Another object is to provide an improved gear or pulley-cable type of levelling mechanism. A further object is to utilize gearing or its equivalent for the dual functions of levelling a seat and applying a counter-balancing spring load thereto. A further object is to provide for adjustment of the load-balancing spring means in such a combination.

These and other objects will become apparent in the ensuing specification, taken with the appended drawings, in which:

FIG. 1 is a side elevational view of a seat cushioning mechanism embodying the invention;

FIG. 2 is a front elevational view of the same;

FIG. 3 is a plan view of the same, with one side portion shown in section as indicated by line 3—3 of FIG. 2;

FIG. 4 is a fragmentary detail sectional view illustrating the means for maintaining minimum preload flexure of the flexing springs;

FIG. 4A is a schematic diagram showing the mechanism in its upper limit position;

FIG. 5 is a detail axial sectional view of one of the sprocket-pinion clusters and its journal mounting;

FIG. 6 is a fragmentary axial sectional view of the upper spring anchor rod and associated parts;

FIG. 7 is a fragmentary transverse sectional view of the mechanism taken as indicated by the line 7—7 of FIG. 3;

FIG. 8 is a transverse sectional view taken on line 8—8 of FIG. 3; and

FIG. 9 is a fragmentary transverse sectional view of a modified form of the apparatus, taken in a vertical plane approximately the same as that of FIG. 8.

Referring now to the drawings in detail, I have shown therein, as one form in which the invention can be embodied, a cushioning support mechanism comprising, in general, a base frame A adapted to be fixed to a supporting surface; a movable seat platform B on which a seat (e.g., motor vehicle driver's seat) can be mounted; a plurality of low-rate flexing-compression springs C; levelling gearing D; a load-balancing spring with adjustment E; and a dash-pot unit F.

Base frame A comprises a base plate 10 and a pair of side members 11 and 12 rising from respective sides thereof and braced by corner gussets 13. It includes two pairs of integral bosses 14 for mounting trunnions for gearing D, two pairs of bosses 15 for roller-support studs, a pair of bosses 16 for a lower spring-anchor rod of preload assembly C, and a bearing boss 17 for an adjustment shaft of balance spring mechanism E. The paired bosses are in aligned, opposed relation at opposite sides of the base frame A. Frame A further includes an integral pedestal 18 on which dash-pot unit F is mounted, and a pair of roller studs 19 for guide rollers of levelling mechanism D.

Seat platform unit B comprises a plate 20 on which a seat can be mounted, and integral depending spiders 21 each embodying a pair of guide legs 22 at respective corners of the platform. Legs 22 are formed with respective roller-guide tracks 23, with adjacent spur-tooth racks 24, and with related guide lips 25, all extending vertically in parallel relation. The roller tracks and racks can be fabricated as separate parts and mounted upon flanges 26 formed integrally with legs 22 as integral parts of platform B.

Platform unit B further includes a ram 27 projecting downwardly from the center of plate 20 and having in its lower end a transverse bore for reception of an upper spring anchor shaft. It also includes a pair of spring anchor shaft mounting bosses 28 on respective ears formed integrally with spiders 21, projecting downwardly from the lower margins of central web portions of the spiders.

Guide tracks 23 are rollingly engaged by rollers 29 journalled on studs 19 mounted in side members 11 and 12.

Preload spring assembly C (FIG. 2) comprises two sets of flexing coil springs 30 balanced on opposite sides of the central vertical axis of dash-pot unit F. Each set comprises a plurality of pairs of springs 30. The springs of each pair (FIGS. 7 and 8) are in opposed, balanced relation on opposite sides of a medial transverse plane (the common plane of the axes of upper and lower spring anchor rods 31 and 32 to which all of the preload springs are anchored). In the assembled seat-cushioning mechanism, the springs 30 are bowed by preload flexing, away from said medial plane. The preload consists of two components, namely (1) the preload of the unoccupied platform unit B and the seat mounted thereon, including their static weight and the limiting action of a stop yoke 33 (FIG. 4) which engages the springs at an upper limit position and maintains them in minimum-bowed condition illustrated schematically in FIG. 4A; and (2) the static weight of the load (person or object supported by the seat) indicated by the word "LOAD" in FIG. 8. The complete preload will cause the platform B to sink to a position intermediate its top limit position and its bottom limit position, such intermediate position being approximately as shown in FIG. 8. In this position, the springs 30 will be flexed by the full preload to the bowed condition shown in FIG. 8. Within their range of spring action, flexing from the bowed condition of FIG. 8 to the increased bowed condition seen in FIG. 7 (the bottom limit position) the springs will operate with a substantially zero rate, maintaining a supporting force that is substantially, though not absolutely, constant throughout their compression strokes, so as to provide minimum resistance to upward closing movements of base frame A toward platform B in response to road shocks developed in a motor vehicle in which an occupied seat is carried by the mechanism. Thus the load-balancing spring unit E can be adjusted so as to be only slightly distended by the static preload, and its full range of positive-rate extension can be utilized in absorbing the road shocks.

When the load is absent and the springs 30 are in the minimum preload condition shown in FIG. 4A, the platform unit B will be supported in the upper limit position indicated schematically in FIG. 4A. The useful range of deflection of springs 30 may be regarded as including the preload flexing of the springs from the slightly-bowed, minimum preload condition of FIG. 4A to the fully preloaded condition of FIG. 8. In the range of such preload flexing, the springs have a positive rate such as to absorb a major portion of the dead weight of the load. For example, a set of the springs 30 of three-quarter inch diameter, may have a unit preload-absorption force of 16 pounds and the set would then provide preload support of a magnitude of 192 pounds. Assuming that the preload dead weight (of the platform, the seat—e.g., 45 pounds—and the seat-occupant—e.g., 175 pounds—) is 220 pounds, a net of 28 pounds preload will be imposed upon the load-balancing spring unit E. Assuming that spring unit E has a rate of 20 pounds per inch, the 28 pound net preload will extend it approximately two inches to place the apparatus in static balance. Additional extension of unit E under closing movements of base frame A relative to platform unit B will provide the additional force required for absorbing road shocks, etc., the springs 30 flexing without substantial resistance to the closing movements.

Each spring 30 (FIG. 4) comprises a coil body 34 which can be straight in its completely unstressed condition, a tail 35 at each end, extending in alignment with one side of coil body 34, and an eye 36 on the end of each tail 35, protruding entirely on one side of the axis of the tail on the side away from the coil body 34, whereby an angle $\phi$ (of about 10°) will be subtended between the respective tail 35 and a line extending from the center of eye 36 to the junction between tail 35 and the coil body 34.

Thus the application of a compressive load to the center of eye 36 will create a bending force which is of relatively low magnitude when the coil body 34 is only slightly flexed as in FIG. 4A, and which attains increasing magnitude by increasing leverage as flexing action increases, thus absorbing the spring rate of preload deflection, until the spring rate drops to substantially zero magnitude at the fully preloaded position of FIG. 8.

Referring to FIGS. 6, 7 and 8, the central portion of upper spring anchor shaft 31 extends through ram 27 and is thereby supported. The ends of the shaft 31 are anchored in the bosses 28 of spider 21 of platform unit B. Mounted on shaft 31, on respective sides of ram 27, are bearing sleeves 37 (FIG. 6). Spring terminal eyes 36 are threaded on sleeves 37 in adjoining pairs that are positioned between the ends of spacer collars 38 encircling the sleeves 37. A similar arrangement of bearing sleeves and spacer collars (not shown) is utilized in anchoring the eyes 36 of the lower end tails 35 to the lower anchor rod 32, which has its ends anchored in bosses 16 of base frame A and its center supported by the pedestal 18, which has a transverse bore through which rod 32 extends.

Stop yokes 33 include side arms 39 the upper ends of which are apertured and hung upon upper spring anchor rod 31, and transverse bottom webs which are interposed between the upper spring tails 35, acting as spreaders to hold the tails in the downwardly-diverging relation shown in FIG. 4.

The springs of each pair are in opposed relation across the median transverse plane of the spring assembly, being offset from exact registration to the extent of the thickness of the tails (FIG. 2).

Levelling mechanism D comprises a pair of tubular shafts 40 each carrying an opposed pair of gear elements 41, 42, secured to its respective ends and having suitable longwear (e.g., nylon) bearing bushings 43 in its respective ends; and a pair of trunnions 44 received in a respective bushing 43 and supporting the respective ends of a respective shaft 40 for rotation; each trunnion 44 being formed as part of a bolt-stud having a threaded shank 45 threaded through a respective boss 14 of base frame A, and a head 46. Gear elements 41 are plain spur gears, and elements 42 are gear clusters, including respective spur gear parts 47 and sprockets 48 and 49. Spur gears 41, 47 are meshed with spur-toothed racks 24 (FIGS. 3 and 8) of platform unit B. Sprockets 48, 49 are tied together by a chain 50, one end of which, at 51, is anchored to the front sprocket 48, an intermediate portion of the chain extending from sprocket 48 to sprocket 49 and being wrapped around the rear sprocket 49, and the remaining portion of the chain extending from sprocket 49 to the adjustable load-balancing unit E which adjustably anchors it.

Gear units 41, 42 of each pair are secured to their respective shafts 40 for enforced unison rotation. Chain 50, being wrapped in one direction about sprocket 48 and in the opposite direction about sprocket 49, and being spring-loaded under tension by load-balancing unit E, enforces unison rotation of sprockets 48, 49 (and their respective shafts and spur gear parts) in opposite directions. Thus the four legs 22 of platform unit B are urged and permitted to move vertically at uniform rate so as to maintain platform B in a levelled condition at all times.

FIG. 9 illustrates a cable-pulley equivalent of the rack and gear mechanism of FIG. 8, wherein a cable 90 (corresponding to the rack and gear teeth) is anchored at 91 to a pulley 92 (corresponding to gear 41) and at 93 to the lower end of a vertical bar 94 (corresponding to rack 24) and is adapted to wind upon and unwind from pulley 92 while transmitting upward movement to and receiving downward movement from bar 94 which is formed as an integral part of a leg 95 (corresponding to a leg 22). Pulley 92 is mounted on a respective end of a shaft 40 which is the same as in FIGS. 1–8, other parts likewise being the same, as indicated by like reference numerals designating them.

Adjustable load-balancing unit E comprises a quarter-segment 60 of a sprocket, the chain 50 meshing with the toothed periphery thereof and anchored at 61 to the extremity thereof remote from sprocket 49. Sprocket segment 60 has a hub 62 pivotally mounted on one end of lower spring-anchor shaft 32, and an anchor pin 63 secured to its extremity opposite the chain anchorage 61. A load-balancing coil spring 64 has one end anchored to pin 63 and its other end anchored to an adjustment arm 65 the lower end of which is secured upon a stub shaft 66 that is pivoted in bearing boss 17. Load-balancing spring may be fully unloaded or very slightly tensioned in the upper limit position of FIG. 4A depending on the adjustment of arm 65, and is slightly extended in the fully preloaded position of FIG. 8. Secured to the outer end of stub shaft 66 is an adjustment lever 67 having at its upper end a slide bearing barrel 68 in which is slidably mounted a latch bolt 69. Bolt 69 may be spring-loaded by means which, being conventional, is not shown. Its inner end is receivable, with latching engagement, in a selected one of an arcuate array of keeper holes 70 (FIG. 1). Shifting lever 70 outwardly (away from section 60) increases the preload pull of spring 64. Shifting the lever in the opposite direction reduced its preload value.

Dash-pot unit F (FIG. 7) comprises a cylinder 75 mounted on pedestal 18 with its lower end sealed thereby; a piston 71 of inverted cup shape slidable in cylinder 70 and sealed thereto by an O-ring 72 to provide a sealed dash-pot chamber; a compression spring 73 under compression between pedestal 18 and the head of piston 71 and yieldingly supporting the piston normally in an elevated position (e.g., as in FIG. 8) and an impact block 74 of compressible cushioning material mounted in the piston head to receive the impact of ram 27.

Controlled escape of air from cylinder 75 and reentry of air into the cylinder is provided for by a restrictive bleed valve 85 having an axial passage 86, threaded into a transverse threaded bore 87 in pedestal 18, and a port 88 which provides communication between the bore 87 and the space below piston 71 in cylinder 75. By proper adjustment of valve 85, the escape of air may be restricted so as to prevent bottoming of piston 75 against pedestal 18, while at the same time minimizing rebound caused by compressed air in the unit F.

In operation, the apparatus will assume the upper limit position of FIG. 4A when subjected only to the partial preload of the platform unit B and the seat (not shown) carried thereby. When the seat is occupied by a vehicle driver (or camera or other load) the platform unit B will sink to the normal fully loaded position of FIG. 8 and will remain there so long as the load is static. In doing so, it will absorb the relatively high initial load of flexing springs 30, flexing them to approximately the beginning of their substantially constant loading or zero rate range. Thus a major portion of the full load is statically balanced. At the same time, the relatively small residue of the load is balanced by the initial extension of positive-rate coil springs 64, leaving a major portion of their load capacity remaining unused. Upon subjection to inertial loads such as road shocks, the base frame A will rise relative to platform unit B, the gear units 41, 42 tracking upwardly along racks 24 so as to be rotated in unison in opposite directions under the control and against the spring-loaded pull of chain 50. Driven by the rotating sprockets 48, 49, the chain 50 will swing the sprocket segment 60 arcuately as indicated by arrow 80 in FIG. 8, pulling the load-balancing spring 64 to extended condition. In accordance with the positive rate of spring 64, and with the assistance of dash-pot unit F, the inertial load will be absorbed until fully dissipated, or until the piston 71 bottoms out in cylinder 75, the residue of shock being absorbed by cushion 74 in such extreme cases.

Upon rebound, under the pull of spring 64, the initial rebound force will substantially be dissipated when the platform unit B reaches the intermediate position of FIG. 8 (when spring 64 will have returned to a substantially unloaded condition) and such additional return movement as may occur through momentum, will move the flexing springs 30 into the beginning of their preload range, in which they will develop a mild supporting force tending to maintain the platform in an elevated position above the statically balanced intermediate position of FIG. 8, but yielding gradually to the load as the momentum is dissipated, and lowering the platform gently back to the statically balanced position.

I claim:
1. Seat cushioning apparatus comprising:
   a base frame adapted to be mounted on a movable support; said base frame having upwardly projecting side members;
   a platform with reference to which said base frame is vertically movable;
   means operable between said base frame and platform to maintain the platform levelled with respect to the base frame; and
   a plurality of flexing type preload-absorbing coil springs having respective ends anchored to said platform and base frame respectively at points offset laterally from the longitudinal axes of said springs so as to be bowed laterally with a low-rate flexing action when subjected to compression between said platform and base frame beyond a preloaded partially bowed condition;
   said springs having a high rate resistance to preloading so as to absorb and support at least a major portion of a static load imposed on said platform and to then yield with low rate resistance to additional loading by inertial action of said load.

2. Apparatus as defined in claim 1, including positive rate load-balancing spring means operable between said platform and base frame to absorb said initial loading.

3. Seat cushioning apparatus as defined in claim 2, wherein said positive rate spring means includes means for adjusting its loading so as to balance the static load with said flexing type springs preloaded to approximately the beginning of their low-rate range.

4. Seat cushioning apparatus as defined in claim 3, wherein said spring means comprises a coil spring anchored at one end to said adjusting means; and means attached to the other end thereof, operable to transmit a lifting pull to said platform, said pull-transmitting means being geared to said levelling means.

5. Seat cushioning means as defined in claim 1, wherein:
   said platform has legs extending downwardly between and adjacent said side members;
   said legs having respective vertical gear racks adjacent front and rear extremities of said side members;
   said levelling mechanism comprising pairs of gears meshing with said racks, each pair comprising gears at respective sides of said base frame; and shafts each mounting a pair of gears and secured thereto for unison rotation thereof and each extending transversely between said side members and having its ends journalled on respective side members;

said gears tracking on said racks for levelling said platform during relative vertical movements thereof.

6. Seat cushioning means as defined in claim 1, wherein:

said platform has racks extending downwardly between and adjacent said side members;

said levelling mechanism comprising pairs of gears geared to said racks at respective sides of said base frame;

shafts each mounting a pair of said gears and secured thereto for unison rotation thereof and each extending transversely between said side members and having its ends journalled on respective side members;

said gears supporting said racks for levelling said platform during relative vertical movements thereof;

sprockets attached to the gears at one side of said base frame; pull-transmitting means comprising a chain tracking around said sprockets; and positive rate tension spring means applying a pull to said chain for driving said gears to apply a lift to said platform through said racks.

7. Seat cushioning apparatus as defined in claim 1, including positive rate load-balancing spring means operable between said platform and base frame to absorb said additional loading; and wherein said levelling means comprises pulley and cable connections between said platform and said base frame, and wherein said load-balancing spring means is of extensible coil spring type and includes a connection applying a tension pull and a driving connection to said pulley and cable connections, such as to apply lift to said platform.

8. Seat cushioning apparatus as defined in claim 1, including positive rate load-balancing spring means operable between said platform and base frame to absorb said additional loading; and wherein said levelling means comprises rack and gear connection between said platform and said base frame, and wherein said load-balancing spring means is of extensible coil spring type and includes a connection applying a tension pull and a driving connection to said rack and gear connections, such as to apply lift to said platform, and means for adjusting the tension in said load-balancing spring means.

9. Seat cushioning means as defined in claim 1, wherein:

said platform has legs extending downwardly between and adjacent said side members;

said legs having respective vertical gear racks adjacent front and rear extremities of said side members;

said levelling mechanism comprising pairs of gears meshing with said racks, each pair comprising gears at respective sides of said base frame;

shafts each mounting a pair of gears and secured thereto for unison rotation thereof and each extending transversely between said side members and having its ends journalled on respective side members;

positive rate load-balancing tension spring means operable between said platform and base frame to absorb said additional loading; and a load-balancing adjustment means comprising a tilting arm to which said tension spring means is anchored, a stub shaft on which said arm is secured, said stub shaft extending through and journalled in one of said side members; and a lever secured to the outer end of said stub shaft and having latching means cooperating with said one side member to latch said arm in a selected position of adjustment.

10. Seat-cushioning apparatus as defined in claim 1, wherein said preload-absorbing springs have a substantially zero spring rate in their range of deflection beyond their fully preloaded deflection;

11. Seat cushioning means as defined in claim 1, wherein said flexing springs have end tails disposed substantially tangent to the concave sides of their bowed contours, said tails terminating in pivotal connections to common pivots for the corresponding ends of the springs of each pair.

References Cited

UNITED STATES PATENTS

| 593,068 | 11/1897 | Hulse. | |
| 1,734,776 | 11/1929 | Pallenberg | 248—399 XR |
| 1,758,451 | 5/1930 | Manley | 248—422 |
| 2,574,057 | 11/1951 | Peterson | 248—400 XR |
| 3,233,859 | 2/1966 | Beoletto | 248—399 |
| 3,325,137 | 6/1967 | Knudsen | 248—399 XR |

FOREIGN PATENTS 1,142,427  4/1957  France.

FRANCIS K. ZUGEL, Primary Examiner.